US012342921B2

(12) United States Patent
Lap et al.

(10) Patent No.: US 12,342,921 B2
(45) Date of Patent: Jul. 1, 2025

(54) SHAVING SYSTEM WITH SHAVING UNIT AND CLEANING DEVICE

(71) Applicant: KONINKLIJKE PHILIPS N.V., Eindhoven (NL)

(72) Inventors: Reinder Niels Lap, Surhuizum (NL); Ernst Hupkes, Kampen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 113 days.

(21) Appl. No.: 17/768,275

(22) PCT Filed: Oct. 20, 2020

(86) PCT No.: PCT/EP2020/079443

§ 371 (c)(1), (2) Date: Apr. 12, 2022

(87) PCT Pub. No.: WO2021/083726

PCT Pub. Date: May 6, 2021

(65) Prior Publication Data

US 2024/0130506 A1 Apr. 25, 2024
US 2024/0225234 A9 Jul. 11, 2024

(30) Foreign Application Priority Data

Oct. 29, 2019 (EP) .................................... 19205892

(51) Int. Cl.
*A45D 27/46* (2006.01)
*A45D 27/00* (2006.01)
(Continued)

(52) U.S. Cl.
CPC ............. *A45D 27/46* (2013.01); *A45D 27/00* (2013.01); *B26B 19/141* (2013.01); *B26B 19/3833* (2013.01); *B26B 19/386* (2013.01)

(58) Field of Classification Search
CPC ........ A45D 27/00; A45D 27/22; A45D 27/46; A45D 27/225; B26B 19/38;
(Continued)

(56) References Cited

U.S. PATENT DOCUMENTS 5,515,608 A * 5/1996 Zhang ................. B26B 19/3813 30/41
2003/0101589 A1 * 6/2003 Barish ..................... B26B 19/14 30/34.2
(Continued)

FOREIGN PATENT DOCUMENTS

CN 101617885 A 1/2010
EP 0664973 A1 8/1995
(Continued)

OTHER PUBLICATIONS

International Search Report and Written Opinion Dated Dec. 18, 2020 For International Application No. PCT/EP2020/079443 Filed Oct. 20, 2020.

*Primary Examiner* — Sean M Michalski
*Assistant Examiner* — Robert D Cornett

(57) ABSTRACT

A shaving system is disclosed comprising a shaving unit (14) and a cleaning device (22), wherein the shaving unit (14) comprises at least one hair-cutting unit having a movable hair-cutting member; the cleaning device (22) comprises a supporting structure for supporting the shaving unit (14), and a receiving space (26) for receiving the shaving unit (14) when the shaving unit (14) is arranged in a cleaning position supported by the supporting structure (24); and the cleaning device (22) comprises a reservoir (32) for containing a cleaning liquid and a fluid pumping unit (38) for transporting the cleaning liquid from the reservoir (32) to the receiving space (26); wherein the shaving unit (14) comprises a driven coupling member (30) which is accessible from an outside of the shaving unit (14) and which is
(Continued)

coupled to the movable hair-cutting member such that the movable hair-cutting member is drivable by the driven coupling member (30); the cleaning device (22) comprises a driving coupling member (28) which is accessible from an outside of the cleaning device (22), and an electric actuator (34) coupled to the driving coupling member (28) such that the driving coupling member (28) is drivable by the electric actuator (34); and the driving coupling member (28) and the driven coupling member (30) are arranged such that, in the cleaning position of the shaving unit (14), the driven coupling member (30) is coupled to the driving coupling member (28) such that the movable hair-cutting member is drivable by the driving coupling member (28) via the driven coupling member (30).

20 Claims, 5 Drawing Sheets

(51) Int. Cl.
*B26B 19/14* (2006.01)
*B26B 19/38* (2006.01)

(58) Field of Classification Search
CPC ............ B26B 19/3813; B26B 19/3826; B26B 19/3833; B26B 19/386; B26B 19/141
USPC ............ 30/537; 132/292; 134/136, 150, 164
See application file for complete search history.

(56) References Cited

U.S. PATENT DOCUMENTS

| | | | | |
|---|---|---|---|---|
| 2008/0210271 | A1* | 9/2008 | Chasen | B08B 3/02 134/184 |
| 2009/0277024 | A1 | 11/2009 | Sinnema | |
| 2010/0243008 | A1* | 9/2010 | Schmitt | A45D 27/46 134/136 |
| 2012/0217930 | A1* | 8/2012 | Taniguchi | A45D 27/46 320/115 |
| 2013/0008030 | A1* | 1/2013 | Fischer | A45D 27/48 30/41 |
| 2014/0130979 | A1* | 5/2014 | Sanematsu | A45D 27/46 134/201 |
| 2016/0235181 | A1* | 8/2016 | Louwsma | A45D 27/46 |
| 2018/0178400 | A1* | 6/2018 | Smal | B26B 19/20 |
| 2021/0354319 | A1* | 11/2021 | Lap | B26B 19/141 |
| 2022/0202161 | A1* | 6/2022 | Mengerink | B26B 19/14 |

FOREIGN PATENT DOCUMENTS

| | | | |
|---|---|---|---|
| EP | 3115160 | A1 | 1/2017 |
| EP | 3133954 | B1 | 7/2018 |
| EP | 3666114 | A1 | 6/2020 |
| WO | 2004/086901 | A1 | 10/2004 |
| WO | 2005/000539 | A1 | 1/2005 |
| WO | 2007/020590 | A2 | 2/2007 |
| WO | 2020120421 | A1 | 6/2020 |

* cited by examiner

SHAVING SYSTEM WITH SHAVING UNIT AND CLEANING DEVICE

CROSS REFERENCE TO RELATED APPLICATIONS

This application is the U.S. National Phase application under 35 U.S.C. § 371 of International Application No. PCT/EP2020/079443 filed Oct. 20, 2020, which claims the benefit of European Patent Application Number 19205892.3 filed Oct. 29, 2019. These applications are hereby incorporated by reference herein.

FIELD OF THE INVENTION

The present invention relates to a shaving system comprising a shaving unit and a cleaning device for cleaning the shaving unit, wherein the shaving unit comprises at least one hair-cutting unit having a movable hair-cutting member; the cleaning device comprises a supporting structure for supporting the shaving unit, and a receiving space for receiving the shaving unit when the shaving unit is arranged in a cleaning position supported by the supporting structure; and the cleaning device comprises a reservoir for containing a cleaning liquid, and a fluid pumping unit for transporting the cleaning liquid from the reservoir to the receiving space.

BACKGROUND OF THE INVENTION

From WO 2004/086901 A1 a shaving system comprising a shaving device and a cleaning device is known, wherein:

- the shaving device has a shaving unit comprising at least one hair-cutting unit having a movable hair-cutting member;
- the cleaning device comprises a supporting structure for supporting the shaving device, and a receiving space for receiving the shaving unit when the shaving device is arranged in a cleaning position supported by the supporting structure; and
- the cleaning device comprises a reservoir for containing a cleaning liquid and a fluid pumping unit for transporting the cleaning liquid from the reservoir to the receiving space.

In the known shaving system the shaving device can be supported upside down within the supporting structure of the cleaning device that can be manually moved downwardly so that the shaving unit enters into the receiving space into which the cleaning fluid from the reservoir can be pumped using a manually operated fluid pumping unit.

Such a shaving system is advantageous for keeping a hygienic shaving device so that a clean shaving unit can be used for the next shaving session. The cleaning of the shaving unit is also beneficial for maintenance of the shaving device.

The utilization of the cleaning device according to WO 2004/086901 A1 is not convenient for the user, because the fluid pumping unit of the cleaning device must be driven manually. In addition, for a proper cleaning result, the shaving device must be switched on by the user during the cleaning process. This requires the shaving unit to be coupled to the main housing of the shaving device, so that the shaving unit can be driven by the motor of the shaving device. As a result, for a proper cleaning result, the complete shaving device must be placed in the cleaning device. As a result, the supporting structure for the shaving device must have a robust structure. In addition, the presence of the complete shaving device in the cleaning device leads to a rather large overall height of the shaving system during the cleaning process.

EP 664 973 A1 discloses a shaving system including a shaver with a shaving unit, a cleaning device including a supporting structure for supporting the shaver, and a receiving space for receiving the shaving unit of the shaver when the shaver is placed in a cleaning position supported by the supporting structure. Further the cleaning device comprises a reservoir for containing a cleaning liquid and a fluid pumping unit which is electrically driven for transporting the cleaning liquid from the reservoir to the receiving space. In the cleaning position, the shaver is electrically coupled to the cleaning device such that the motor of the shaver can be automatically switched on by the cleaning device during the cleaning process for a proper cleaning result.

Although this shaving system can more easily be used due to a fully automatic cleaning process that is performed once the shaver has been placed on the support structure, also this shaving system has a considerable overall height during the cleaning process because, for a proper cleaning result, the shaving unit must be coupled to the main housing of the shaving device to enable driving of the shaving unit by the motor of the shaving device during the cleaning process. This overall height of the shaving system sometimes poses a difficulty to a user, if available space is limited, such as within a bathroom closet. Also, this overall height of the shaving system decreases the stability of the shaving system and thus increases the risk that a user might accidentally overturn the shaving system.

SUMMARY OF THE INVENTION

In view of the above mentioned disadvantages of the known shaving systems, it is an object of the present invention to provide a shaving system, including a shaving unit and a cleaning device for cleaning the shaving unit, that allows for cleaning of the shaving unit in a simple, cost-effective and convenient manner. In particular, an object of the present invention is to provide a shaving system with a shaving unit and a cleaning device that has a compact design with a small overall height when the shaving unit is arranged in the cleaning device for cleaning.

According to a first aspect of the present invention, a shaving system as mentioned in the opening paragraph is characterized in that:

- the shaving unit comprises a driven coupling member which is accessible from an outside of the shaving unit and which is coupled to the movable hair-cutting member such that the movable hair-cutting member is drivable by the driven coupling member;
- the cleaning device comprises a driving coupling member which is accessible from an outside of the cleaning device, and an electric actuator coupled to the driving coupling member such that the driving coupling member is drivable by the electric actuator; and
- the driving coupling member and the driven coupling member are arranged such that, in the cleaning position of the shaving unit, the driven coupling member is coupled to the driving coupling member such that the movable hair-cutting member is drivable by the driving coupling member via the driven coupling member.

In the shaving system according to the invention, the shaving unit can be driven by the electric actuator of the cleaning device during a cleaning process to achieve a proper cleaning process. As a result, for a proper cleaning by the cleaning device, the shaving unit does not need to be coupled to the main housing of the shaving device which it is part of. In other words, for a proper cleaning of the shaving unit, the shaving unit can be decoupled from the main housing of the shaving device and can be positioned as such in the cleaning device. Thus, a particular advantage of the shaving system according to the invention rests in the fact that a very small overall height of the shaving system is obtained when the shaving unit is in the cleaning position supported by the supporting structure of the cleaning device. In the cleaning position the movable hair-cutting member is driven by the electrical actuator of the cleaning device via the driving coupling member of the cleaning device and the driven coupling member of the shaving unit, so that an effective cleaning process is obtained. A further advantage is that the supporting structure of the cleaning device can be relatively simple, because the supporting structure needs to support only the shaving unit.

In an embodiment of the shaving system according to the invention, the fluid pumping unit is drivable by the electric actuator.

In this way the electric actuator is used for driving the movable hair-cutting member via the driving coupling member and the driven coupling member on the one hand and for driving the fluid pumping unit of the cleaning device on the other hand. This leads to a simple and cost-effective design.

In a further embodiment of the shaving system according to the invention, the cleaning device comprises a control unit configured and arranged for controlling the driving of the driving coupling member by the electric actuator according to a driving program.

This has the advantage that an automatic cleaning process can be obtained, wherein the motion of the moveable hair-cutting member of the shaving unit during the cleaning process is controlled by the control unit according to the driving program.

In a further embodiment of the shaving system according to the invention, the cleaning device comprises a user interface coupled to the control unit by means of which a user of the shaving system can activate the driving program.

This allows the user to start the cleaning operation as desired and possibly to select one of a different set of options, such as a different set of cleaning programs.

In a further embodiment of the shaving system according to the invention, the shaving system further comprises a main housing accommodating a motor and a further driving coupling member coupled to the motor such that the further driving coupling member is drivable by the motor, the shaving unit and the main housing together forming a shaving device; wherein

- the shaving unit comprises a coupling structure configured for releasably coupling the shaving unit to the main housing, said coupling structure having a further driven coupling member which is coupled to the movable hair-cutting member such that the movable hair-cutting member is drivable by the further driven coupling member;
- when the shaving unit is coupled to the main housing by means of the coupling structure, the further driven coupling member is coupled to the further driving coupling member such that the movable hair-cutting member is drivable by the motor via the further driving coupling member and the further driven coupling member.

In this embodiment, the shaving unit is part of a shaving device including a main housing accommodating a motor for driving the movable hair-cutting member of the shaving unit when the shaving unit is coupled to the main housing. The shaving unit is detachably coupled to the main housing via said coupling structure. The coupling structure allows the user to replace the shaving unit by a different kind of functional unit, such as a hair-trimming unit or a brushing unit, so that the shaving device can also be used for other purposes. For cleaning the shaving unit, the shaving unit can be detached from the main housing and placed within the receiving space of the cleaning device. It is to be noted, however, that in this embodiment the shaving unit can also be cleaned by placing the complete shaving device in the cleaning device. Although in this scenario the motor of the shaving device remains coupled to the movable hair-cutting member in the cleaning position of the shaving unit, it is still possible for the electric actuator of the cleaning device to drive the movable hair-cutting member during the cleaning process, provided that the motor of the shaving device is inactive and the resistance of the total drive system of the shaving device is relatively low.

It is further to be noted that the invention also covers embodiments of the shaving system according to the present invention that further comprise a main housing accommodating a motor and a further driving coupling member coupled to the motor, wherein the shaving unit comprises a coupling structure for releasably coupling the shaving unit to the main housing, but wherein the shaving unit comprises only a single driven coupling member. In such embodiments, the single driven coupling member is coupled to the driving coupling member of the cleaning device when the shaving unit is decoupled from the main housing and placed in the cleaning device, and the single driven coupling member is coupled to the further driving coupling member of the main housing of the shaving device when the shaving unit is coupled to the main housing.

In a further embodiment of the shaving system according to the invention, the shaving unit comprises:

- at least two hair-cutting units each having an external cutting member and an internal cutting member which is rotatable relative to the external cutting member; and
- a drive unit which is coupled to the driven coupling member and to the internal cutting member of each hair-cutting unit such that the internal cutting member of each hair-cutting unit is drivable by the driven coupling member;
- wherein the driven coupling member is arranged centrally between the at least two hair-cutting units.

In a further embodiment of the shaving system according to the invention, the shaving unit comprises:

- three hair-cutting units each having an external cutting member and an internal cutting member which is rotatable relative to the external cutting member; and
- a drive unit which is coupled to the driven coupling member and to the internal cutting member of each hair-cutting unit such that the internal cutting member of each hair-cutting unit is drivable by the driven coupling member;
- wherein the three hair-cutting units are mutually arranged in a triangular configuration and the driven coupling member is arranged centrally between the three hair-cutting units.

In these embodiments wherein the shaving unit has two or three hair-cutting units with a rotatable internal cutting member, the internal cutting members of all hair-cutting units are driven by a single driven coupling member centrally arranged between the hair-cutting units. This results in a simple structure of the cleaning device, because the cleaning device needs to have only a single driving coupling member to drive all hair-cutting units of the shaving unit.

According to a second aspect, the invention provides a cleaning device for use in a shaving system as described here before, the cleaning device comprising:

a supporting structure for supporting a shaving unit of a shaving device;

a receiving space for receiving the shaving unit when the shaving unit is arranged in a cleaning position supported by the supporting structure; and a reservoir for containing a cleaning liquid and a fluid pumping unit for transporting the cleaning liquid from the reservoir to the receiving space;

wherein the cleaning device comprises a driving coupling member which is accessible from an outside of the cleaning device, and an electric actuator coupled to the driving coupling member such that the driving coupling member is drivable by the electric actuator.

As described in detail here before with respect to the shaving system according to the invention, the cleaning device according to the invention allows to clean a shaving unit of a shaving device in isolation from the main housing of the shaving device that accommodates the motor of the shaving device, i.e. in a decoupled condition from said main housing. As a result, the shaving system has a small height when the shaving unit is arranged for cleaning in the cleaning device, and the cleaning process is still very effective since the shaving unit can be driven by the electrical actuator of the cleaning device via the driving coupling member.

In an embodiment of the cleaning device according to the invention, the driving coupling member is accessible and arranged such that, in the cleaning position of the shaving unit, the driving coupling member is coupled to a driven coupling member of the shaving unit such that a movable hair-cutting member of the shaving unit is drivable by the driving coupling member via the driven coupling member.

Thus, in the cleaning position of the shaving unit, the moveable hair-cutting member of the shaving unit can be driven by the electric actuator of the cleaning device via the driving coupling member of the cleaning device and the driven coupling member of the shaving unit.

In a further embodiment of the cleaning device according to the invention, the driving coupling member is arranged in the receiving space.

This allows for a simple and compact design of the cleaning device.

In a further embodiment of the cleaning device according to the invention, the driving coupling member is arranged centrally in a bottom wall of the receiving space.

This allows for an easy placement of the shaving unit within the receiving space and an easy engagement of the driving coupling member of the cleaning device with the driven coupling member of the shaving unit.

In a further embodiment of the cleaning device according to the invention, the fluid pumping unit is drivable by the electric actuator.

This embodiment provides a simplified design of the cleaning device, since the electric actuator is used for driving the driving coupling member as well as for driving the fluid pumping unit.

A shaving unit for use in a shaving system according to the invention may comprises:

at least one hair-cutting unit having a movable hair-cutting member;

a driven coupling member which is accessible from an outside of the shaving unit and which is coupled to the movable hair-cutting member such that the movable hair-cutting member is drivable by the driven coupling member;

a coupling structure configured for releasably coupling the shaving unit to a main housing of a shaving device and having a further driven coupling member which is coupled to the movable hair-cutting member such that the movable hair-cutting member is drivable by the further driven coupling member.

Such a shaving unit is suited for use within a shaving system according to the invention as described here before, and provides the technical advantages as described here before with respect to the shaving system according to the invention.

In the shaving unit for use in a shaving system according to the invention, the driven coupling member may be accessible for coupling to a driving coupling member of a cleaning device for the shaving unit when the shaving unit is arranged in a cleaning position relative to the cleaning device, such that the movable hair-cutting member is drivable by the driving coupling member via the driven coupling member.

The shaving unit for use in a shaving system according to the invention may further comprises:

at least two hair-cutting units each having an external cutting member and an internal cutting member which is rotatable relative to the external cutting member; and a drive unit which is coupled to the driven coupling member and to the internal cutting member of each hair-cutting unit such that the internal cutting member of each hair-cutting unit is drivable by the driven coupling member;

wherein the driven coupling member is arranged centrally between the at least two hair-cutting units such that the driven coupling member is accessible from the outside of the shaving unit.

The shaving unit for use in a shaving system according to the invention may further comprises:

three hair-cutting units each having an external cutting member and an internal cutting member which is rotatable relative to the external cutting member; and a drive unit which is coupled to the driven coupling member and to the internal cutting member of each hair-cutting unit such that the internal cutting member of each hair-cutting unit is drivable by the driven coupling member;

wherein the three hair-cutting units are mutually arranged in a triangular configuration and the driven coupling member is arranged centrally between the three hair-cutting units such that the driven coupling member is accessible from the outside of the shaving unit.

A shaving device for use in a shaving system according to the invention may comprise:

a shaving unit for use in a shaving system according to the invention as described here before; and a main housing accommodating a motor and a further driving coupling member coupled to the motor such that the further driving coupling member is drivable by the motor;

wherein, when the shaving unit is coupled to the main housing by means of the coupling structure of the shaving unit, the further driven coupling member of the shaving unit is coupled to the further driving coupling member such that the movable hair-cutting member of the shaving unit is drivable by the motor via the further driving coupling member and the further driven coupling member.

These embodiments of a shaving device can be easily used in combination with a cleaning device according to the invention as described here before for cleaning the shaving unit, in particular by releasing the shaving unit from the main housing of the shaving device and placing only the shaving unit in the cleaning device.

It is noted that, of course, it is also possible, to place the complete shaving device on the cleaning device so that the shaving unit is received within the receiving space. To this end, it may be advantageous to add a supporting stand that helps to keep the main housing or handle of the shaving device in a substantially upside down position on the cleaning device. When the electric actuator of the cleaning device is actuated and the motor of the shaving device is off (i.e. not actuated), a rotation of the internal cutting members of the hair-cutting unit will be effected.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE EMBODIMENTS

Figure 1:
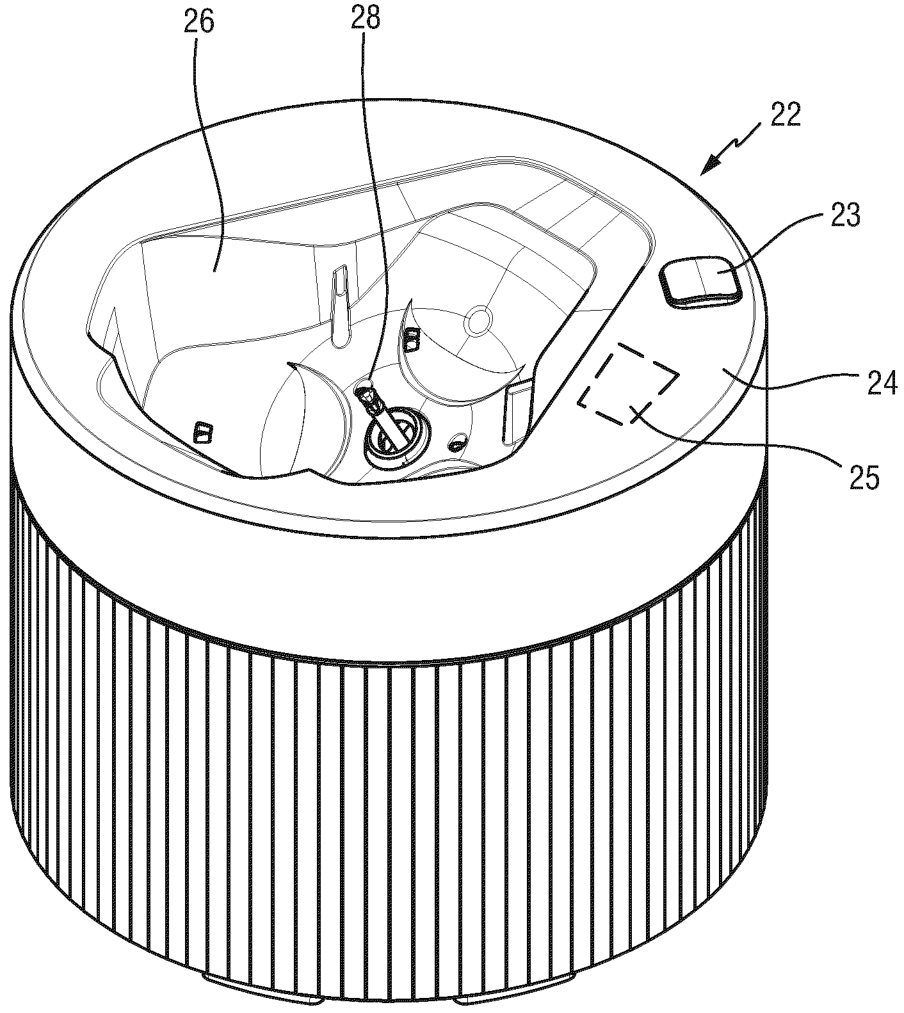
FIG. 1 shows a perspective view of a cleaning device of a shaving system according to the invention, including a receiving space, wherein a shaving unit of a shaving device can be placed.

In FIG. 1 a cleaning device 22 is shown in perspective view. The cleaning device 22 includes a housing that forms a supporting structure 24, whereon a shaving unit 14 of a shaving device 12 (see FIG. 2) can be placed in a cleaning position. The pot-shaped supporting structure 24 comprises a recess at the top forming a receiving space 26 for receiving the shaving unit 14 in the cleaning position. A driving coupling member 28 protrudes from the bottom of the receiving space 26.

FIG. 1 further schematically shows an electronic control unit 25 (shown in dashed lines) that can be operated by a user via a user interface 23.

Figure 2:
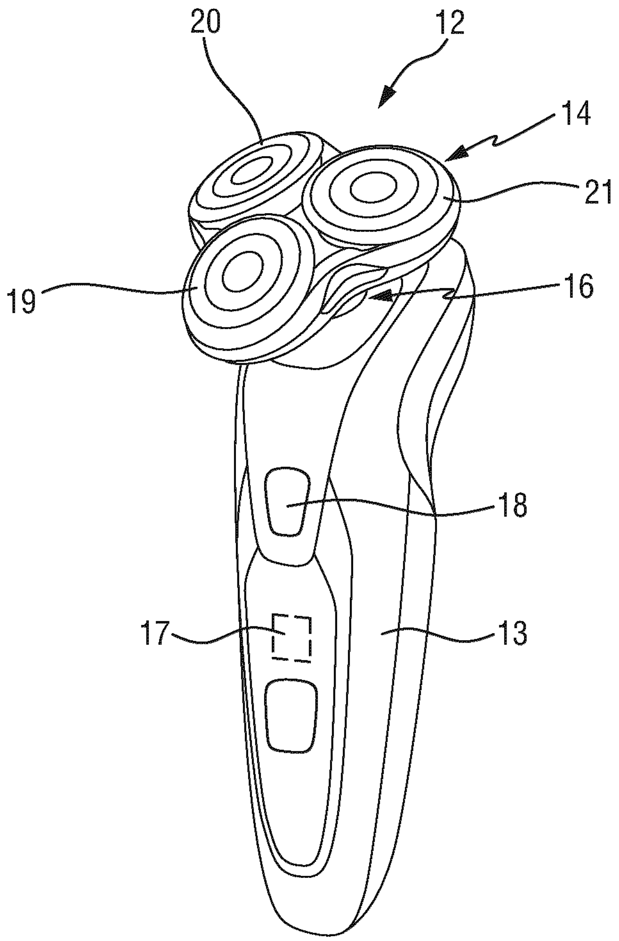
FIG. 2 shows an enlarged perspective view of a shaving device of the shaving system according to the invention.

The shaving device 12 as shown in FIG. 2 comprises a main housing 13, wherein a motor 17 is accommodated that can be activated by pressing a motor switch 18. A shaving unit 14 including three hair cutting units 19, 20, 21 arranged in a triangular configuration is releasably coupled to the main housing 13 via a coupling structure 16. As shown in FIG. 6, each hair-cutting unit 19, 20, 21 comprises an external cutting member 56 which is fixed, and an internal cutting member 58 which is rotatable with respect to the external cutting member 56. In the center between the three hair-cutting units 19, 20, 21 there is arranged a driven coupling member 30. If the motor 17 is activated and the shaving unit 14 is coupled to the main housing 13, the motor 17 drives the internal cutting members 56 of the hair-cutting units 19, 20, 21 via a drive train 54 and a further driving coupling member 52 arranged in the main housing 13 (both are not shown in FIG. 2, but only schematically indicated in dashed lines in FIG. 5), and via a further driven coupling member 50 of the coupling structure 16 which is coupled to the internal cutting members 58 of the hair-cutting units 19, 20, 21.

Figure 3:
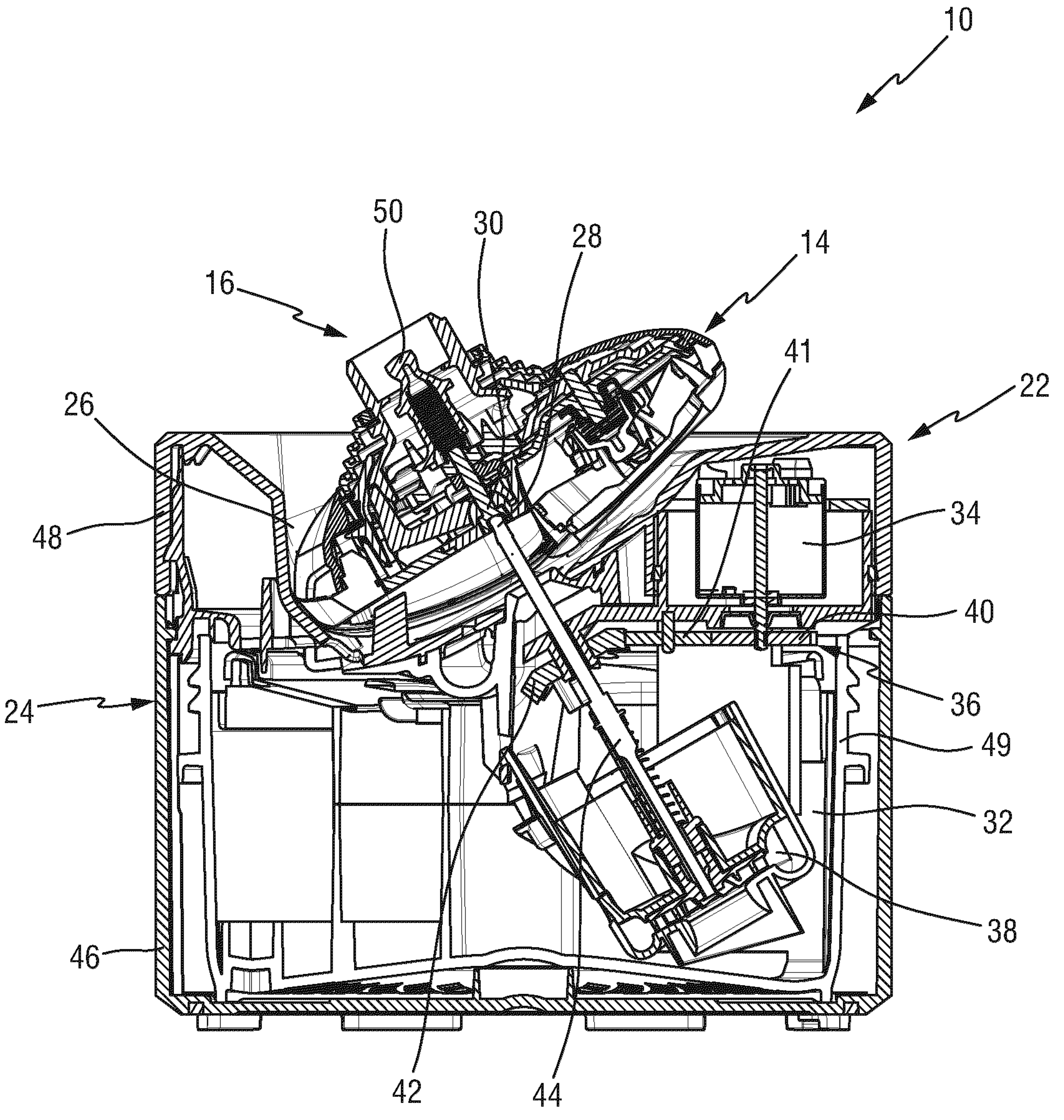
FIG. 3 shows a cross-section of the cleaning device of FIG. 1, wherein in addition the shaving unit of the shaving device of FIG. 2 is shown in a cleaning position within the cleaning device.

When the shaving unit 14 of the shaving device 12 is decoupled from the main housing 13 and placed on the cleaning device 22 in the receiving space 26 in the cleaning position, the driven coupling member 30 engages the driving coupling member 28 as shown in FIG. 3.

The cleaning device 22 forms a shaving system according to the invention together with the shaving unit 14 or together with the shaving device 12. In FIG. 3 a shaving system comprising the cleaning device 22 and the shaving unit 14 placed within the receiving space 26 is designated in total with reference numeral 10. As shown in FIG. 3, the pot-shaped supporting structure 24 comprises a lower housing portion 46 onto which an upper housing portion 48 is placed. The upper housing portion 48 has a top wall, wherein a substantially triangular opening is formed that provides access to the receiving space 26 extending into the interior of the supporting structure 24. The shape of the receiving space 26 (confer FIG. 1) substantially corresponds to the shape of the shaving unit 14 of the shaving device 12.

Within the upper housing portion 48 of the cleaning device 22 there is arranged an electric actuator 34 which comprises a motor gear 40 that meshes with an intermediate gear 41, which meshes with a pump gear 42 arranged on a pump shaft 44 of a fluid pumping unit 38 that is held within the lower housing portion 46. At the outer end of the pump shaft 44 the driving coupling member 28 is provided. When the electric actuator 34 is actuated, the fluid pumping unit 38 is activated, whereby cleaning fluid obtained within a reservoir 32 within the lower housing portion 46 is circulated upwardly into the upper housing portion 46 and into the receiving space 26, and then back into the reservoir 32. Simultaneously, the pump shaft 44 rotates the driving coupling member 28 which engages the driven coupling member 30 of the shaving unit 14. As explained hereinafter in further detail with reference to FIG. 5, thereby the internal hair-cutting members 58 of each hair-cutting unit 19, 20, 21 are rotated to assist the cleaning operation.

Figure 5:
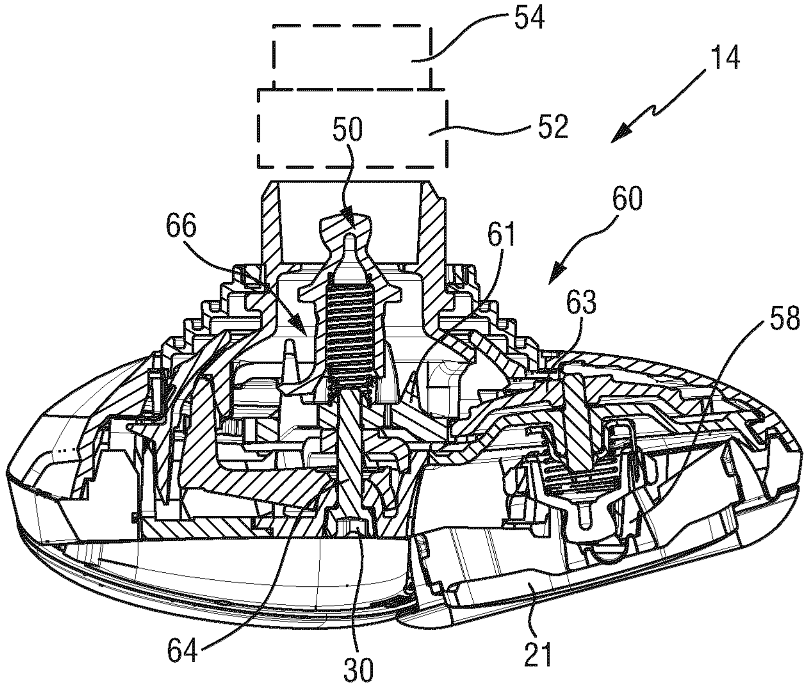
FIG. 5 shows an enlarged cross-section of the shaving unit of the shaving device of FIG. 2 having a further driven coupling member and a drive unit coupled to the driven coupling member.
Figure 6:
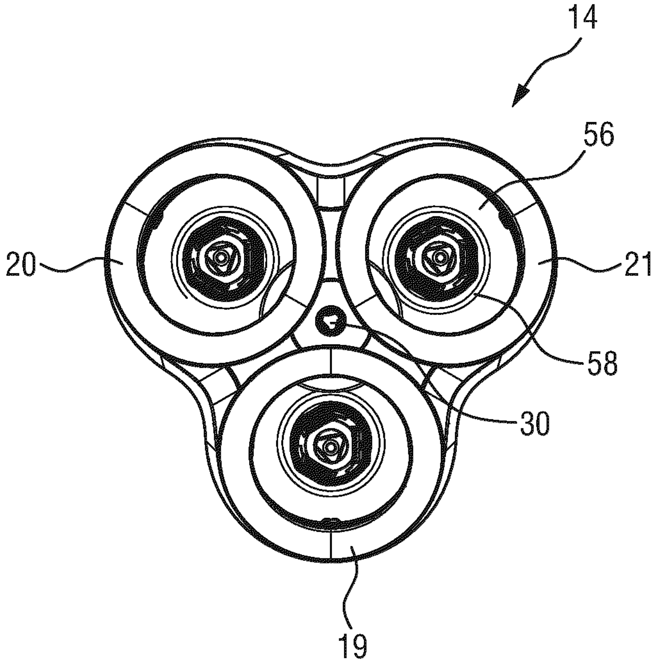
FIG. 6 shows an enlarged top view of the shaving unit of the shaving device of FIG. 2 with three hair-cutting units and a centrally arranged driven coupling member.

As shown in FIG. 5, the further driven coupling member 50 of the shaving unit 14 is rotationally coupled to the driven coupling member 30 of the shaving unit 14 by an internal coupling structure 66 comprising a drive shaft 64 which at its outer end comprises the driven coupling member 30.

As shown in FIG. 6, each hair-cutting unit 19, 20, 21 comprises an external cutting member 56 and a respective internal cutting member 58 (not visible and only schematically indicated in FIG. 6 with reference numeral 58). The internal cutting members 58 are rotatable relative to the external cutting members 56 to effect cutting of hairs. It is noted that, instead of the three hair-cutting units 19, 20, 21, the shaving unit 14 may have only one or two such hair-cutting units or more than three such hair-cutting units. The hair-cutting unit(s) may be of a different type as shown in the figures. In particular the hair-cutting unit(s) may have an elongated foil-type external cutting member with hair-entry openings and an internal cutting member which is configured and arranged to make a linear reciprocating motion relative to the external cutting member. The driven coupling member of the shaving unit may be arranged in any position on the shaving unit suitable for engaging a driving coupling member of the a cleaning device for cleaning the shaving unit.

Figure 4:
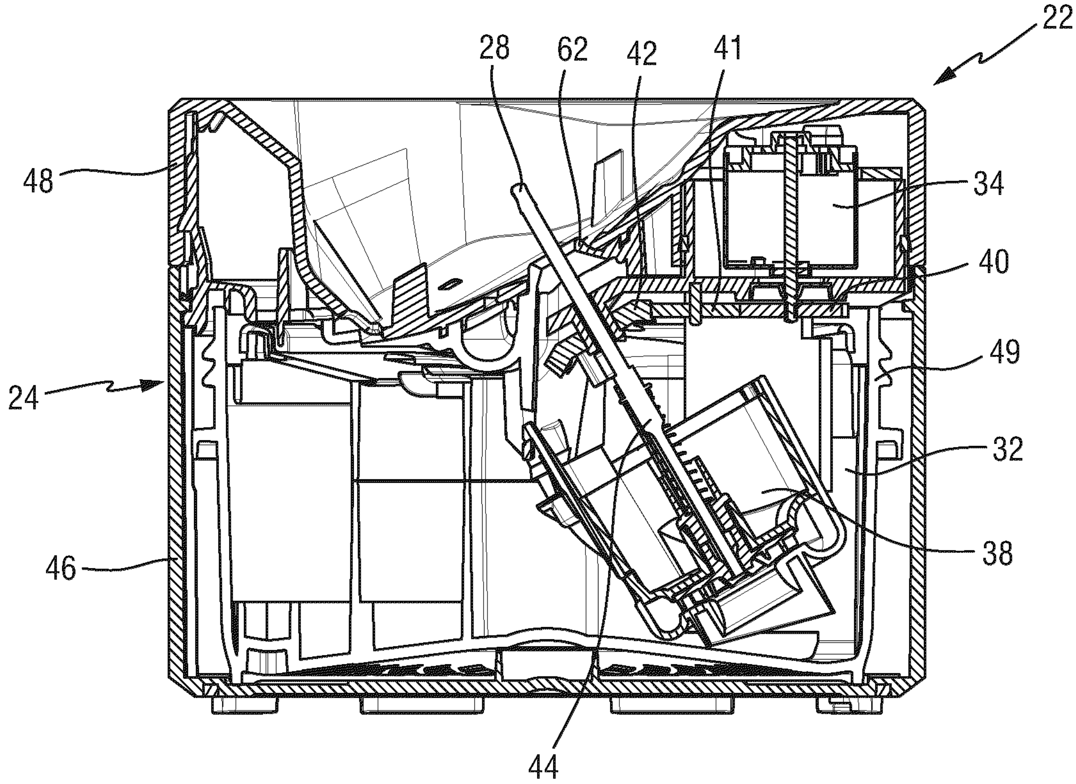
FIG. 4 shows the cross-sectional view according to FIG. 3, but without the shaving unit of the shaving device of FIG. 2.

From FIGS. 3 and 4 it can be seen that a cartridge 49 that contains the cleaning liquid, is releasably held within the lower housing portion 46. The electric actuator 34 including the gears 40, 41, 42 is provided within the upper housing portion 48. The fluid pumping unit 38 that protrudes into the lower housing portion 46 is fixed to the upper housing portion 48. When the upper housing portion 48 is released from the lower housing portion 46, it can be removed together with the fluid pumping unit 38. Then the cartridge 49 containing the cleaning fluid can be removed. The cartridge 49 contains the cleaning liquid and can be provided as a separate consumer replaceable part, which a user can insert into the cleaning device 14 and which needs to be replaced usually after a certain number of cleaning operations.

When the shaving unit 14 according to FIG. 5 is coupled to the main housing 13 of the shaving device 12, the internal cutting members 58 of the shaving unit 14 can be driven by the motor 17 indicated in FIG. 2 by dashed lines. The motor 17 via the drive train 54 drives a further driving coupling member 52 that is part of the coupling structure 16. The drive train 54 and the further driving coupling member 52 of the shaving device 12 are both indicated in FIG. 5 by dashed lines.

When the shaving unit 14 is coupled to the main housing 13, the further driving coupling member 52 engages the further driven coupling member 50 shown in FIG. 5. The further driven coupling member 50 via a drive unit 60 comprising meshing gears 61 and 63 drives the internal cutting members 58 of the three hair-cutting units 19, 20, 21. Thus when the further driving coupling member 52 engages the further driven coupling member 50, the internal cutting members 58 of the hair-cutting units 19, 20, 21 can be rotationally driven by the motor 17.

For cleaning the shaving unit 14, the main housing 13 which is configured as a handle may be decoupled from the shaving unit 14 by releasing the coupling structure 16 and withdrawing the further driven coupling member 50 of the shaving unit 14 from the further driving coupling member 52 of the main housing 13. The shaving unit 14 may then be placed in the cleaning position within the receiving space 26 of the cleaning device 22. As a result, the driven coupling member 30 of the shaving unit 14 is coupled to the driving coupling member 28 of the cleaning device 22. A user may then activate an automatic cleaning program, stored in the control unit 25, by means of the user interface 23. The control unit 25 then controls the electric actuator 34, so that the electric actuator 34 will drive the fluid pumping unit 38 and the driven coupling member 30 of the shaving unit 14 according to the cleaning program. The driven coupling member 30 is coupled to the internal cutting member 58 of each of the three hair-cutting units 19, 20, 21 via the drive unit 60. As a result, during the execution of the cleaning program the internal cutting members 58 of the hair-cutting units 19, 20, 21 will be driven by the electric actuator 34 of the cleaning device 22 via the driving coupling member 28 of the cleaning device and the driven coupling member 30 and the drive unit 60 of the shaving unit 14.

It is noted that, in alternative embodiments, the cleaning device may have separate actuators to drive the fluid pumping unit 38 and the driving coupling member 28. In such embodiments the control unit 25 may drive said separate actuators independently according to different programs. This may improve the cleaning process.

Instead of placing only the shaving unit 14 in the cleaning device 22, in alternative embodiments the complete shaving device 12 including the shaving unit 14 may be placed on the cleaning device 22 with the shaving unit 14 being received within the receiving space 26. When in this condition the electric actuator 34 of the cleaning device 22 is actuated and the motor 17 of the shaving device 12 is not powered and inactive, the internal cutting members 58 of the hair-cutting units 19, 20, 21 will still be driven into rotation by the electric actuator 34 of the cleaning device 22, provided that the mechanical and electromechanical resistances of the motor 17 and the drive train 54 in the main housing 13 are sufficiently low.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A shaving system comprising a shaving unit and a cleaning device, wherein:

the shaving unit comprises:

at least one hair-cutting unit having a movable hair-cutting member, and a driven coupling member which is accessible from an outside of the shaving unit and which is coupled to the movable hair-cutting member such that the movable hair-cutting member is drivable by the driven coupling member;

the cleaning device comprises:

a supporting structure for supporting the shaving unit, a receiving space for receiving the shaving unit when the shaving unit is arranged in a cleaning position supported by the supporting structure, a reservoir for containing a cleaning liquid, a fluid pumping unit for transporting the cleaning liquid from the reservoir to the receiving space;

a driving coupling member which is accessible from an outside of the cleaning device, and an electric actuator coupled to the driving coupling member such that the driving coupling member is drivable by the electric actuator; and the driving coupling member and the driven coupling member are arranged such that, in the cleaning position of the shaving unit, the driven coupling member is coupled to the driving coupling member such that the movable hair-cutting member is drivable by the driving coupling member via the driven coupling member.

2. The shaving system as claimed in claim 1, wherein the fluid pumping unit is drivable by the electric actuator.

3. The shaving system as claimed in claim 1, wherein the cleaning device comprises a control unit configured and arranged for controlling the driving of the driving coupling member by the electric actuator according to a driving program.

4. The shaving system as claimed in claim 3, wherein the cleaning device comprises a user interface coupled to the control unit by which a user of the shaving system can activate the driving program.

5. The shaving system as claimed in claim 1, further comprising a main housing accommodating a motor and a further driving coupling member coupled to the motor such that the further driving coupling member is drivable by the motor, the shaving unit and the main housing together forming a shaving device; wherein the shaving unit further comprises a coupling structure configured for releasably coupling the shaving unit to the main housing, said coupling structure having a further driven coupling member which is coupled to the movable hair-cutting member such that the movable hair-cutting member is drivable by the further driven coupling member;

when the shaving unit is coupled to the main housing by the coupling structure, the further driven coupling member is coupled to the further driving coupling member such that the movable hair-cutting member is drivable by the motor via the further driving coupling member and the further driven coupling member.

6. The shaving system as claimed in claim 5, wherein the shaving unit further comprises:

at least two hair-cutting units each having an external cutting member and an internal cutting member which is rotatable relative to the external cutting member; and a drive unit which is coupled to the driven coupling member and to the internal cutting member of each hair-cutting unit such that the internal cutting member of each hair-cutting unit is drivable by the driven coupling member;

wherein the driven coupling member is arranged centrally between the at least two hair-cutting units.

7. The shaving system as claimed in claim 5, wherein the shaving unit further comprises:

three hair-cutting units each having an external cutting member and an internal cutting member which is rotatable relative to the external cutting member; and a drive unit which is coupled to the driven coupling member and to the internal cutting member of each hair-cutting unit such that the internal cutting member of each hair-cutting unit is drivable by the driven coupling member;

wherein the three hair-cutting units are mutually arranged in a triangular configuration and the driven coupling member is arranged centrally between the three hair-cutting units.

8. A cleaning device for use in a shaving system, said cleaning device comprising:

a supporting structure for supporting a shaving unit of a shaving device;

a receiving space for receiving the shaving unit when the shaving unit is arranged in a cleaning position supported by the supporting structure;

a reservoir for containing a cleaning liquid;

a fluid pumping unit for transporting the cleaning liquid from the reservoir to the receiving space;

a driving coupling member which is accessible from an outside of the cleaning device; and an electric actuator coupled to the driving coupling member such that the driving coupling member is drivable by the electric actuator.

9. The cleaning device as claimed in claim 8, wherein the driving coupling member is accessible and arranged such that, in the cleaning position of the shaving unit, the driving coupling member is coupled to a driven coupling member of the shaving unit such that a movable hair-cutting member of the shaving unit is drivable by the driving coupling member via the driven coupling member.

10. The cleaning device as claimed in claim 8, wherein the driving coupling member is arranged in the receiving space.

11. The cleaning device as claimed in claim 10, wherein the driving coupling member is arranged centrally in a bottom wall of the receiving space.

12. The cleaning device as claimed in claim 8, wherein the fluid pumping unit is drivable by the electric actuator.

13. The cleaning device as claimed in claim 8, wherein the receiving space is configured to receive a shaving unit having three hair-cutting units.

14. The cleaning device as claimed in claim 13, wherein the driving coupling member is positioned such that it extends upwardly between the three hair cutting units when the shaving unit is arranged in the cleaning position.

15. The cleaning device as claimed in claim 8, wherein the driving coupling member protrudes upwardly through a bottom wall of the receiving space.

16. The cleaning device as claimed in claim 15, wherein the electric actuator is configured to rotate the driving coupling member.

17. The cleaning device as claimed in claim 16, wherein a distal end of the driving coupling member is configured for engagement with a rotatable member of the shaving unit when the shaving unit is arranged in the cleaning position.

18. The cleaning device as claimed in claim 17, wherein the distal end of the driving coupling member is configured for insertion into the rotatable member of the shaving unit when the shaving unit is arranged in the cleaning position.

19. The cleaning device as claimed in claim 8, wherein the cleaning device comprises a control unit configured and arranged for controlling the driving of the driving coupling member by the electric actuator according to a driving program.

20. The cleaning device as claimed in claim 19, wherein the cleaning device comprises a user interface coupled to the control unit by which a user of the shaving system can activate the driving program.

* * * * *